United States Patent
Morofuji (10) Patent No.: US 7,551,222 B2
(45) Date of Patent: Jun. 23, 2009

(54) IMAGE PICKUP APPARATUS WITH AUTOMATIC FOCUS LENS, WHEN AUTO FOCUSING CANNOT BE CONDUCTED FOCUS LENS IS DRIVEN BASED ON STORED INFORMATION OF DISTANCE TO OBJECT

(75) Inventor: Tsuyoshi Morofuji, Shioya-gun (JP)

(73) Assignee: Canon Kabushiki Kaisha (JP)

( * ) Notice: Subject to any disclaimer, the term of this patent is extended or adjusted under 35 U.S.C. 154(b) by 564 days.

(21) Appl. No.: 11/345,935

(22) Filed: Feb. 1, 2006

(65) Prior Publication Data
US 2006/0170813 A1   Aug. 3, 2006

(30) Foreign Application Priority Data
Feb. 2, 2005   (JP) .............................. 2005-026463

(51) Int. Cl.
*H04N 5/232* (2006.01)
(52) U.S. Cl. ..................... 348/345; 348/342; 348/349; 348/351; 348/353; 348/356; 348/216.1; 348/211.12
(58) Field of Classification Search ............. 348/211.12
See application file for complete search history.

(56) References Cited

U.S. PATENT DOCUMENTS

| | | | |
|---|---|---|---|
| 5,418,595 A | * | 5/1995 | Iwasaki et al. ................ 396/95 |
| 5,528,289 A | * | 6/1996 | Cortjens et al. ........... 348/211.9 |
| 5,745,166 A | * | 4/1998 | Rhodes et al. ............... 348/143 |
| 6,222,588 B1 | | 4/2001 | Yamazaki et al. |
| 6,359,647 B1 | * | 3/2002 | Sengupta et al. ............ 348/154 |
| 2004/0151486 A1 | * | 8/2004 | Goris et al. .................. 396/147 |

FOREIGN PATENT DOCUMENTS

JP      2721471      11/1997

* cited by examiner

*Primary Examiner*—David L Ometz
*Assistant Examiner*—Angel L Garces-Rivera
(74) *Attorney, Agent, or Firm*—Rossi, Kimms & McDowell LLP (57) ABSTRACT

In an image pickup apparatus, information of a distance to an object is acquired according to an image pickup direction such as panning or tilting under a condition where focusing can be conducted, an image pickup direction is detected at a present position due to a panning angle and a tilting angle in the case where focusing cannot be conducted at a low illumination level, the information of distance to an object corresponding to the detected image pickup direction is read out from the memory, and a focus lens is driven at the read position, thereby making it possible to take a photograph even under a condition where the object cannot be focused.

12 Claims, 7 Drawing Sheets

IMAGE PICKUP APPARATUS WITH AUTOMATIC FOCUS LENS, WHEN AUTO FOCUSING CANNOT BE CONDUCTED FOCUS LENS IS DRIVEN BASED ON STORED INFORMATION OF DISTANCE TO OBJECT

BACKGROUND OF THE INVENTION

1. Field of the Invention

The present invention relates to an image pickup apparatus having a power zoom lens, automatic focusing means, and a power turning camera platform, which is used in, for example, a teleconference system or a remote monitor system.

2. Related Background Art

In a television camera, an image signal obtained by exposing an object image to an image pickup element such as a CCD or CMOS for a given period of time is converted into a digital signal, and then subjected to a given process such as a YC process to obtain an image signal of a given format.

There has been known an automatic focus system in which the sharpness level of a screen is detected according to an image signal of the object image, and a focus lens position is controlled so that the sharpness level becomes maximum to conduct focusing.

As an evaluation of the sharpness level of the image, there is used a signal indicative of the intensity of a high frequency component obtained by allowing the image signal to pass through a band pass filter (BPF), or a signal indicative of the sharpness level such as a blur range of the image signal extracted by differentiation.

In the case where a normal object is photographed, the signal indicative of the sharpness level is small in a defocusing state and becomes larger as the focus is clearer. The signal becomes maximum in the focusing state.

Accordingly, as a control of a focus lens, after the focus lens is driven at a high speed in a direction in which the sharpness level is increased when the sharpness level is small, the sharpness level is inverted when the sharpness level switches over from the increase to decrease, and thereafter the focus lens stops at a mountain summit (an area where the sharpness level becomes maximum).

Figure 9:
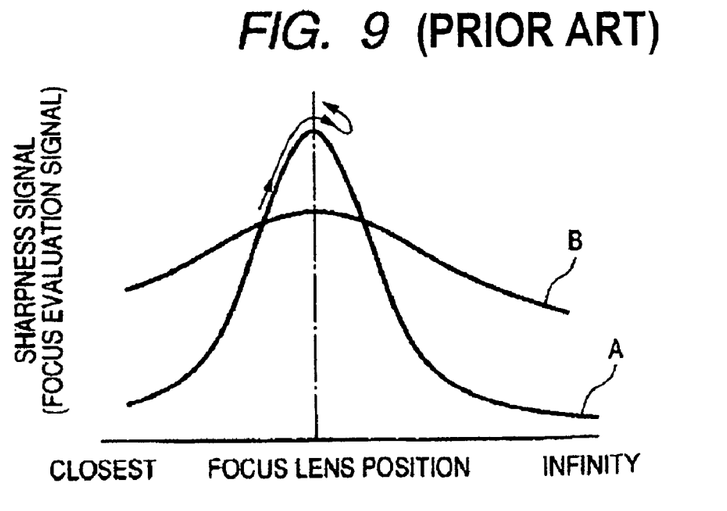
FIG. 9 is an explanatory diagram showing a method of obtaining an automatic focus sharpness level.

This system is widely known as a Maximum Power Point Tracking automatic focus control system indicated by a line A of FIG. 9.

However, in the automatic focusing device using the image signal, the dependency on the object is high.

For that reason, as indicated by a line B of FIG. 9, the mountain (change) per se of the sharpness signal is gentle in the object low in the contrast, and therefore it may be very difficult to detect the summit.

Also, because AF cannot be conducted, there may occur a trouble that hunching occurs.

Also, in a camera system used for monitoring, there are various conditions such as scenes in which the contrast is extremely low in the night, or there is no object to be monitored.

In that case, focusing operation becomes inactive.

SUMMARY OF THE INVENTION

The present invention has been made to eliminate the above problems, and therefore an object of the present invention is to provide an image pickup apparatus that is capable of automatically conducting focusing operation according to various conditions. In the image pickup apparatus according to the present invention, the information of distance to an object corresponding to an image pickup direction such as panning or tilting is acquired in advance, and the focusing operation can be smoothly and surely conducted even in the night when the distance to the object cannot be measured.

In other words, in the case where focusing cannot be conducted, the image pickup direction area until focusing cannot be conducted is detected due to the panning angle and the tilting angle, and the information of distance to an object with respect to that area is read out from a memory in which the information is stored in advance.

Thereafter, the focus lens is driven on the basis of the distance to the object which is stored according to the position of the zoom lens.

According to the image pickup apparatus of the present invention, since the information of distance to an object corresponding to the image pickup direction such as panning or tilting is acquired in advance, the focusing operation can be smoothly and surely conducted.

DESCRIPTION OF THE PREFERRED EMBODIMENTS

Now, a description will be given in more detail of preferred embodiments of the present invention with reference to the accompanying drawings.

First Embodiment

Figure 1:
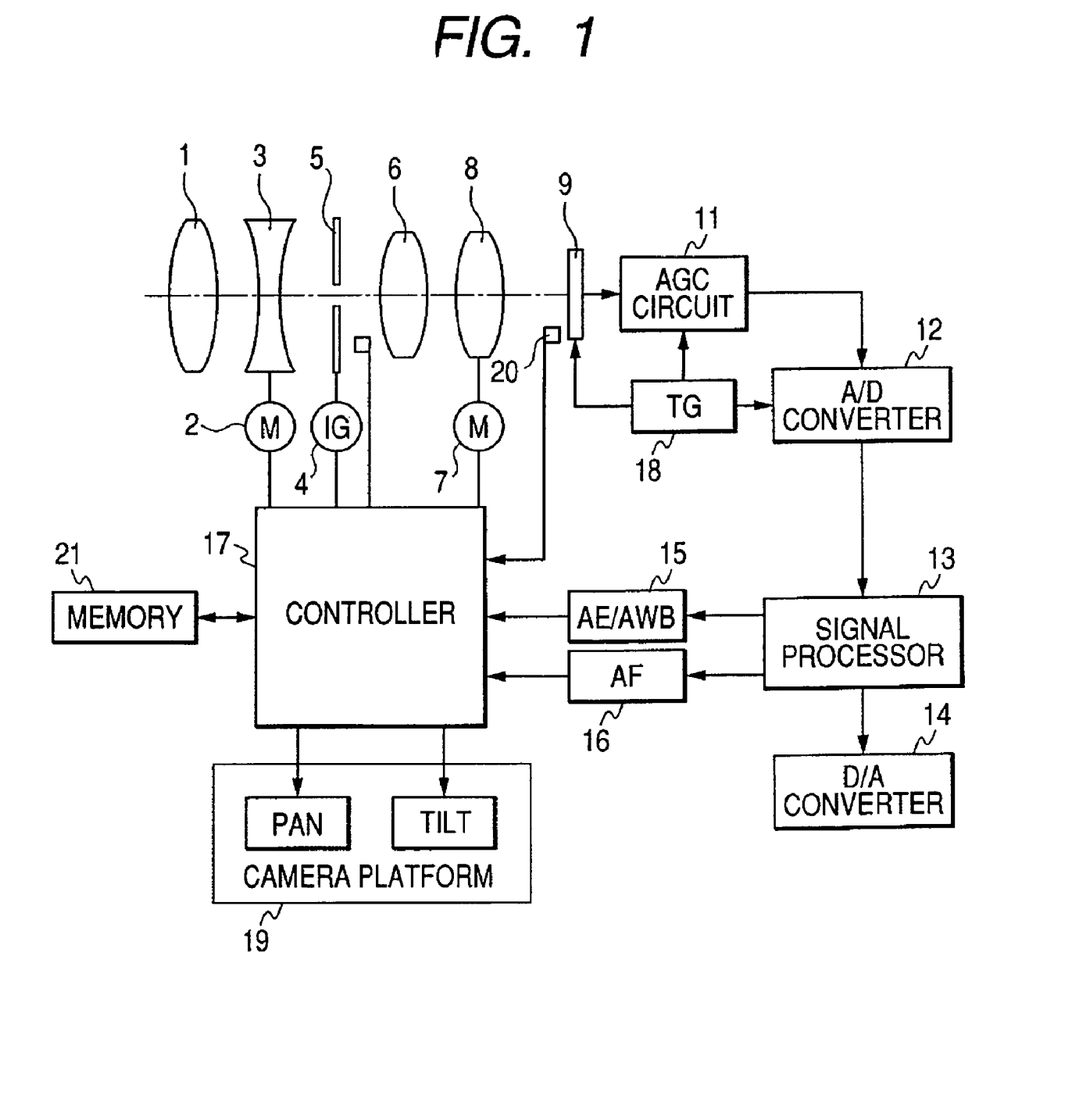
FIG. 1 is a block diagram showing a structure of a first embodiment.

FIG. 1 is a block diagram showing a structure of a camera system according to a first embodiment.

An image taking optical system is structured as follows.

A stationary front lens 1 that constitutes a first group lens and a zoom lens 3 that constitutes a second lens group are disposed. The zoom lens 3 is driven by a stepping motor 2.

Also, an aperture 5 that is driven by aperture drive means 4, and a stationary third lens group 6 are disposed.

Also, a focus lens 8 that is driven by a stepping motor 7 to adjust a focal point, and an image pickup element 9 such as a CCD or a CMOS sensor are disposed.

An output of the image pickup element 9 is connected to a D/A converter 14 through an AGC (automatic gain control) circuit 11, an A/D converter 12, and a signal processor 13.

An output of the signal processor 13 is connected to an evaluation processing circuit 15 that detects the evaluation value of an automatic exposure adjustment (AE)/automatic white balance adjustment (AWB), and an AF evaluation value detection processing circuit 16 that detects the evaluation value of an automatic focusing (AF).

The outputs of those evaluation processing circuits 15 and 16 are connected to a controller 17 consisting of a microcomputer.

Also, an output of a synchronized signal generation circuit (timing generator) 18 is connected to the image pickup element 9, the AGC circuit 11, and the A/D converter 12.

An output of the controller 17 is connected to the stepping motor 2, the aperture driving means 4, the stepping motor 7, and a power turning camera platform 19 having the panning and tilting functions.

In addition, the controller 17 is connected to an output of a temperature detection sensor 20 that is disposed in the vicinity of the image pickup element 9, and also is connected to a memory 21.

In the above structure, an optical image of the object is focused onto an image pickup surface of the image pickup element 9 through the lenses 1, 3, 6, and 8, and then converted into an electric signal.

In this situation, when the aperture 5 is fully opened, the brightness signal level of the amount of light received by the image pickup element 9 does not reach a predetermined value, the signal is amplified according to the brightness of the object by the AGC circuit 11. Thereafter, the signal is converted into a digital signal by the A/D converter 12.

Thereafter, the image signal is appropriately processed by the signal processor 13 in conformity with image signal standards such as color separation, white balance, and gamma correction. Thereafter, the image signal thus processed is converted into a video signal of an appropriate format and outputted by the D/A converter 14.

The AF evaluation value detection processing circuit 16 is made up of a gate circuit, a BPF, and the like.

In the gate circuit, the image signal corresponding to the inside of a predetermined ranging frame which is set within the image pickup surface is extracted from the image signal.

In the BPF, a high frequency component is extracted as an evaluation value indicative of the sharpness level necessary to detect focusing.

Also, the sharpness level (focus evaluation) signal that has been detected by the AF evaluation value detection processing circuit 16 is supplied to the controller 17 that panoptically controls the entire system such as AF, AE, and AWB.

Figure 2:
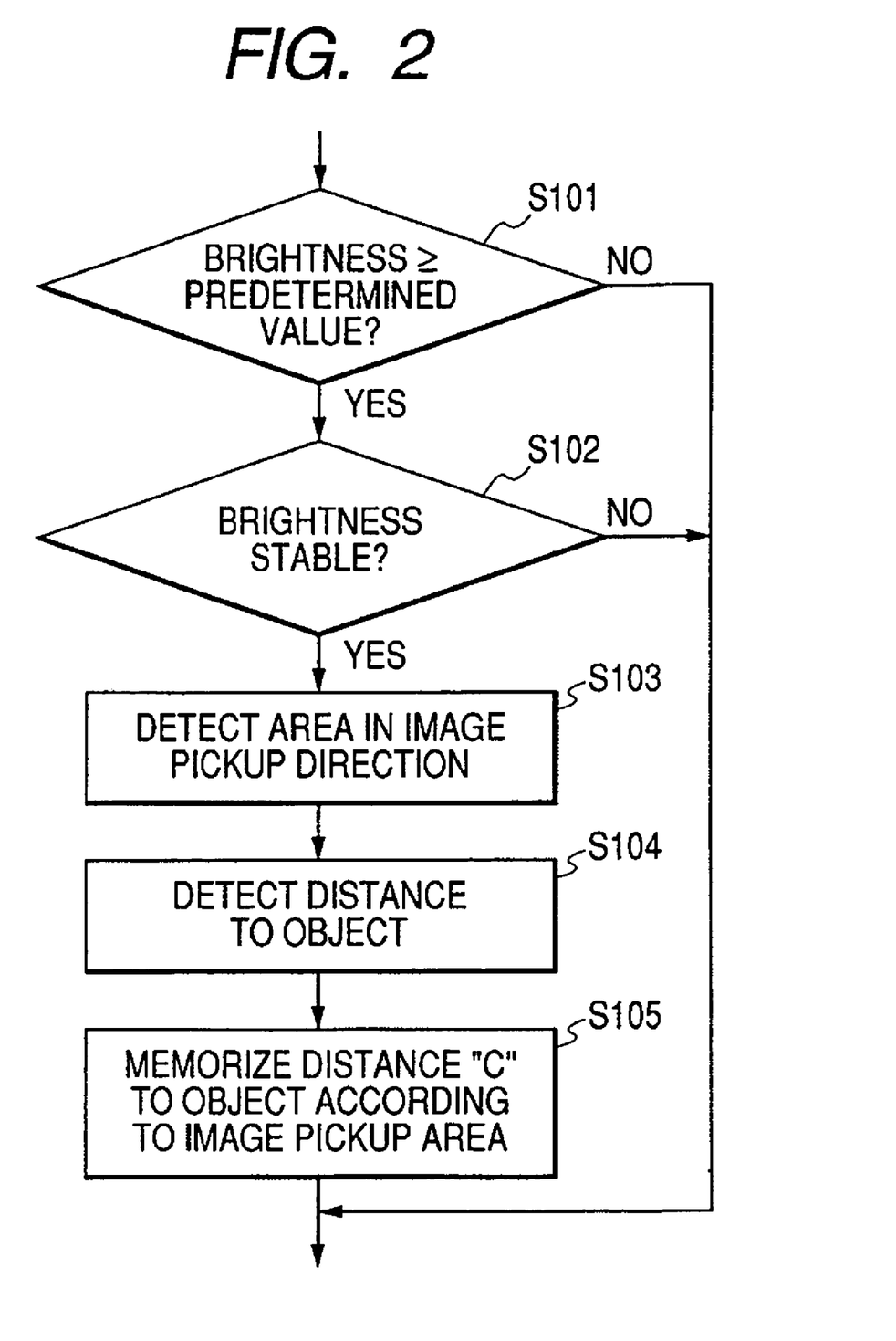
FIG. 2 is a flowchart showing the detecting and storing operation of a distance to an object.

FIG. 2 is a flowchart showing the operation of detecting and storing the distance to the object according to the image pickup direction attributable to the panning and tilting of the power turning camera platform 19.

The incident light intensity (brightness) of the image pickup element 9 is compared with a predetermined value (Step S101), and when the incident light intensity is equal to or higher than a predetermined value, the operation is advanced to Step S102, and the present processing is finished when the incident light intensity is lower than a predetermined value.

Then, it is checked whether the brightness value remains stable within a predetermined period of time, or not (Step S102), and when the brightness value is not stable, the processing is finished.

When the brightness value is stable, an area in the image pickup direction is detected (Step S103), the distance to the object is detected (Step S104), and a distance to the object C is stored in the storage area of the memory 21 according to the photographing area due to the panning and tilting (Step S105).

The following table shows the distance to the object (m) with respect to the panning angles (°) in the column direction and the tilting angles (°) in the row direction of a mapping example which are stored in the memory 21.

In this example, the displacement angle of the panning and tilting is sectioned by 10° basis. For example, in the case where the panning angle is 30° and the tilting angle is 0°, the data of the distance to the object is stored at the position of "C".

| Panning Angle (°) | Tilting Angle (°) | | | | | | | |
|---|---|---|---|---|---|---|---|---|
| | −45 to −35 | −35 to −25 | −25 to −15 | −15 to −5 | −5 to 5 | 5 to 15 | 15 to 25 | 25 to 35 |
| | 3 m | 3 m | 3 m | 3 m | 3 m | 3 m | 8 m | 9 m |
| | 3 m | 3 m | 3 m | 3 m | 3 m | 3 m | 8 m | 9 m |
| | 3 m | 3 m | 3 m | 3 m | 3 m | 3 m | 8 m | 9 m |
| 65 to 55 | 3 m | 3 m | 3 m | 3 m | 3 m | 3 m | 8 m | 9 m |
| 55 to 45 | 3 m | 3 m | 3 m | 3 m | 3 m | 3 m | 8 m | 9 m |
| 45 to 35 | 3 m | 3 m | 3 m | 3 m | 3 m | 3 m | 8 m | 9 m |
| 35 to 25 | 5 m | 5 m | 5 m | 5 m | C | 3 m | 8 m | 9 m |
| 25 to 15 | 3 m | 3 m | 3 m | 3 m | 3 m | 3 m | 8 m | 9 m |
| 15 to 5 | 3 m | 3 m | 3 m | 3 m | 2 m | 3 m | 8 m | 9 m |
| −5 to 5 | 7 m | 7 m | 7 m | 7 m | 2 m | 3 m | 8 m | 9 m |
| −15 to −5 | 3 m | 3 m | 3 m | 3 m | 2 m | 3 m | 8 m | 9 m |
| −25 to −15 | 3 m | 3 m | 3 m | 3 m | 2 m | 3 m | 8 m | 9 m |
| −35 to −25 | 3 m | 3 m | 3 m | 3 m | 3 m | 3 m | 7 m | 9 m |
| −45 to −35 | 3 m | 3 m | 3 m | 3 m | 3 m | 3 m | 7 m | 9 m |
| −55 to −45 | 4 m | 4 m | 4 m | 4 m | 4 m | 5 m | 7 m | 7 m |
| −65 to −55 | 5 m | 5 m | 5 m | 5 m | 5 m | 5 m | 7 m | 7 m |
| −75 to −65 | 8 m | 8 m | 8 m | 8 m | 7 m | 7 m | 7 m | 7 m |
| −85 to −75 | 8 m | 8 m | 8 m | 8 m | 8 m | 8 m | 8 m | 8 m |
| −95 to −85 | 9 m | 9 m | 9 m | 9 m | 9 m | 9 m | 9 m | 9 m |
| −100 to −95 | 9 m | 9 m | 9 m | 9 m | 9 m | 9 m | 9 m | 9 m |

Figure 3:
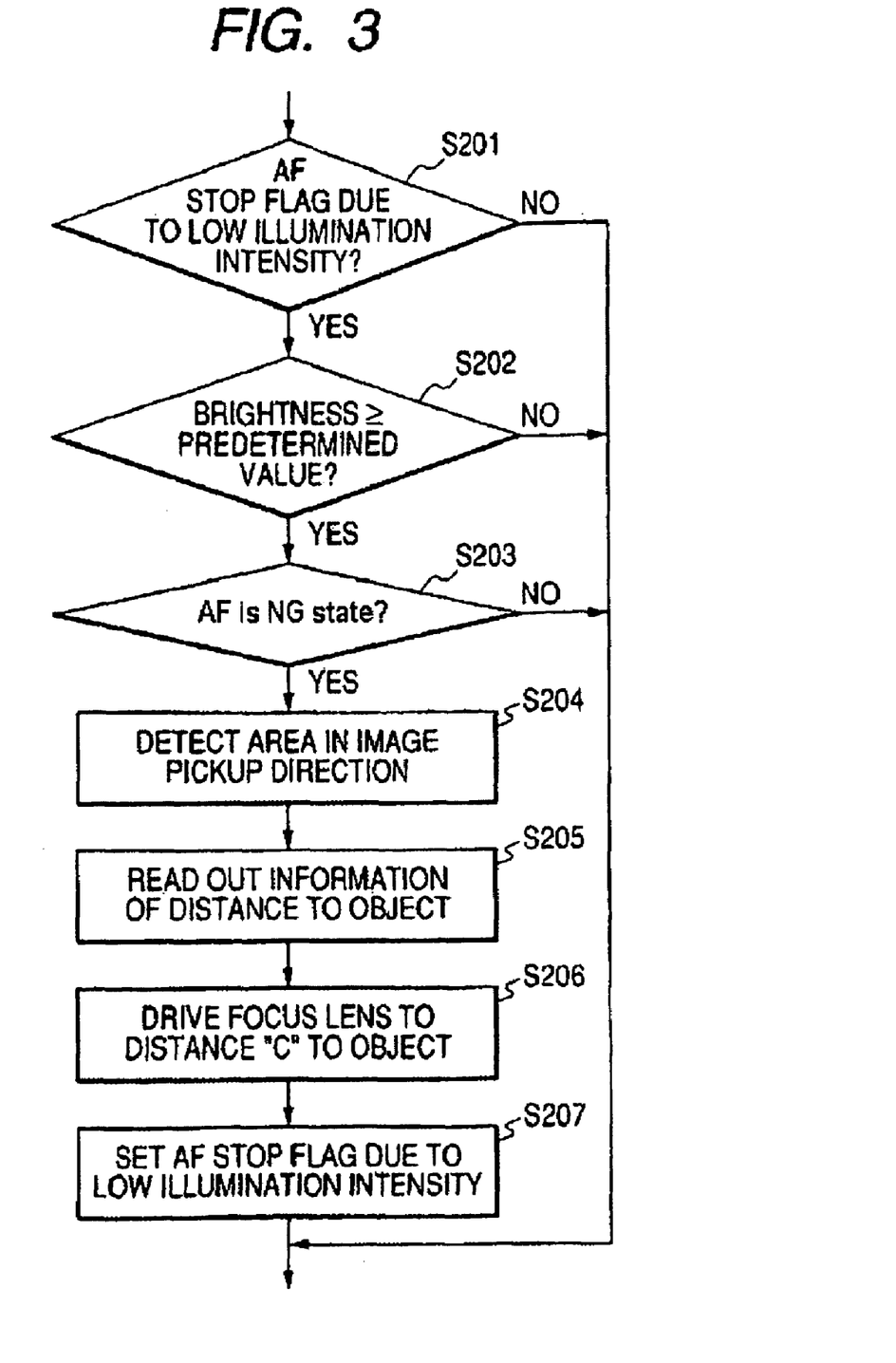
FIG. 3 is a flowchart showing the operation with a low illumination intensity.

FIG. 3 is a flowchart showing the operation under a low illumination intensity.

First, it is checked whether the AF (automatic focus) stop flag due to the low illumination intensity is set, (FIG. 3) or not (Step S201). In the case of the AF stop flag being set due to the low illumination intensity, the operation is finished as it is. In the case of no AF stop flag being set due to the low illumination intensity, the brightness is checked (Step S202), and when the brightness is equal to or higher than a predetermined value, the operation is finished. When the brightness is lower than the predetermined value, the focusing state is checked (Step S203), and when focusing can be conducted, the operation is finished.

In the case where AF cannot be conducted (AF is NG state), the image pickup direction area is detected by the panning angle and the tilting angle in this situation (Step S204), and the information of distance to an object in that area is read out from the memory 21 (Step S205). Thereafter, the focus lens 8 is driven to the distance C to the object which is stored according to the position of the zoom lens 3 (Step S206), and the AF stop flag due to the low illumination intensity is set and finished (Step S207).

Figure 4:
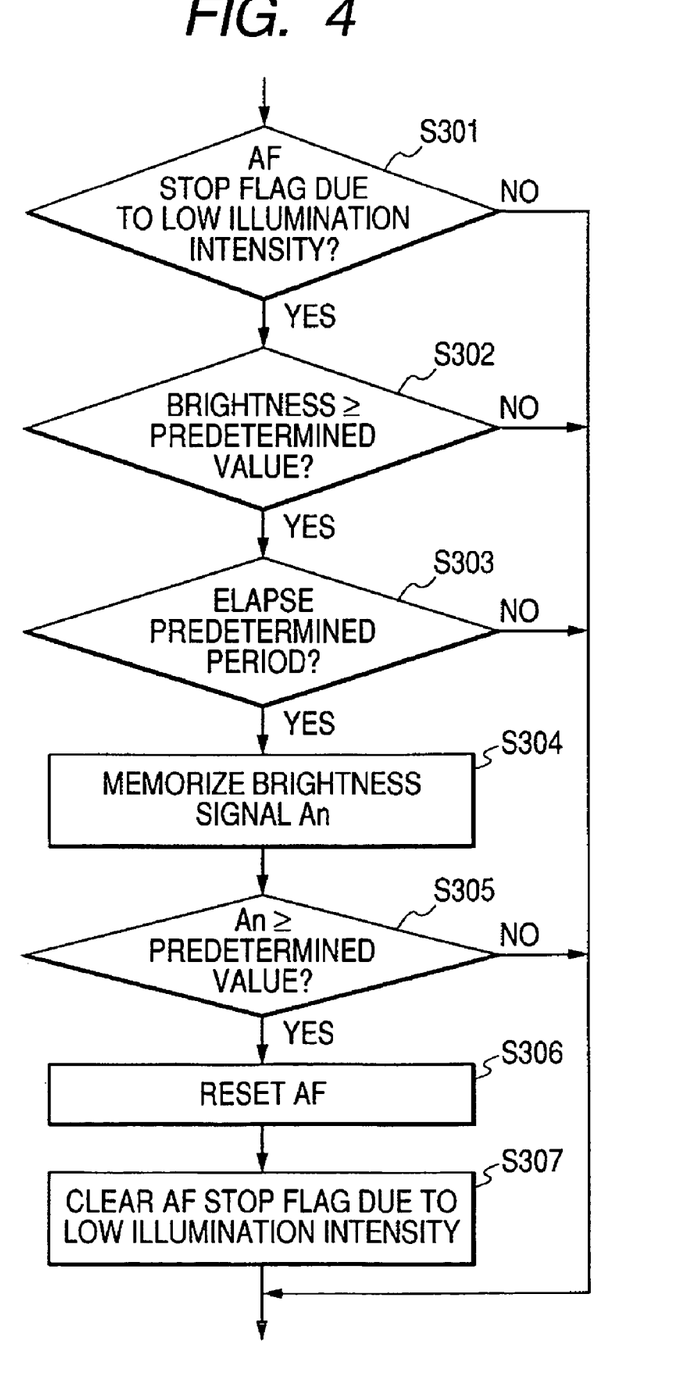
FIG. 4 is a flowchart showing the operation of AF restart with the low illumination intensity.

FIG. 4 is a flowchart showing the operation of from the AF stop state to the AF restart under the low illumination intensity. First, it is checked whether the AF stop flag due to the low illumination intensity is set, (FIG. 4) or not (Step S301). In the case of no AF stop flag being set due to the low illumination intensity, the operation is finished as it is, and in the case of the AF stop flag being set due to the low illumination intensity, the brightness is checked (Step S302), while in the case where the brightness is lower than the predetermined value, the operation is finished.

When the brightness is equal to or higher than the predetermined value, the brightness signal is sampled and taken in the memory 21 every relative long period of time, for example, every about one minute (Steps S303 and S304).

In this example, an appropriate time interval is calculated from the assumed brightness change, and compared with a brightness history in the memory 21 (Step S305). When the comparison result is equal to or higher than a predetermined value, the AF is restarted (Step S306), and the AF stop flag due to the low illumination intensity is released (Step S307).

When hunching is repeated due to the focus disabling of AF, the deterioration of a mechanical mechanism of a motor or the like is facilitated. Also, when AF is stopped at a defocus position, a change in brightness and the amount of change of the sharpness level (focus evaluation value) become extremely small, resulting in an error in an AF restart timing.

As described above, the information of distance to an object is acquired according to the panning angle and the tilting angle in advance, thereby making it possible to focus at a focal point that is relatively high in precision. The main distance to the object in the movable ranges of the panning angle and the tilting angle is stored in the daytime, and the information on the object is referred to in the night, thereby making it possible to prevent defocusing.

Also, a part of the information of distance to an object in the memory 21 is set to a fixed value, with the result that when the image pickup screen is directed to a specific area, it is considered to have a function to determine that there is a specific object.

Figure 5:
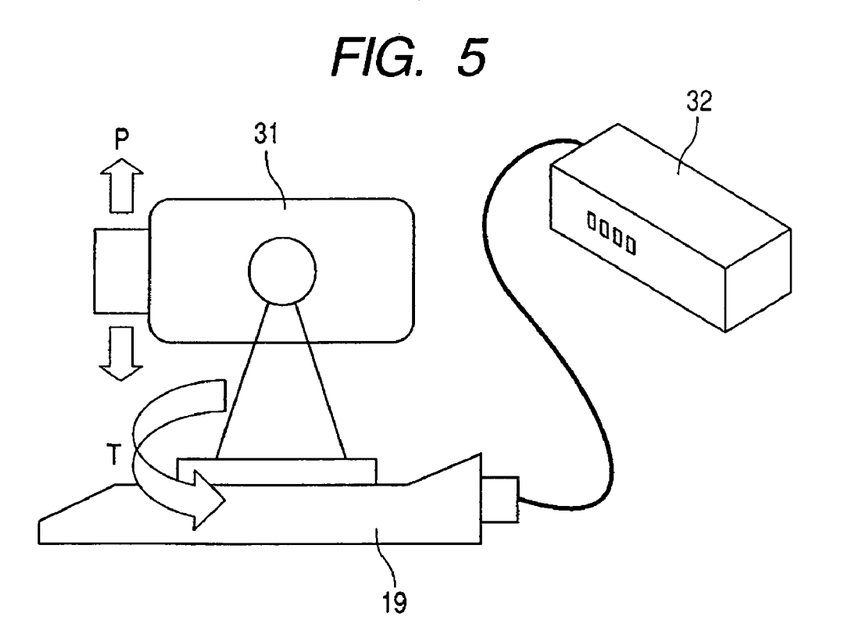
FIG. 5 is an explanatory diagram showing a PTZ camera.

FIG. 5 shows an example of a panning, tilting, and zooming (PTZ) camera.

A PTZ camera 31 that can conduct panning, tilting, and zooming is mounted on a power camera platform 19, and is connected with a video server 32.

Figure 6:
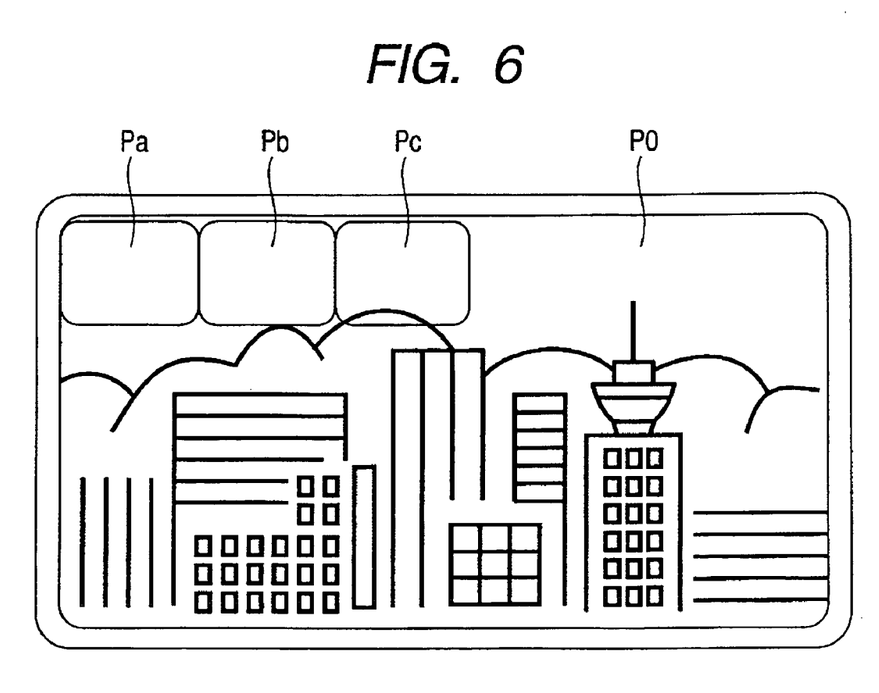
FIG. 6 is an explanatory diagram showing a composite panorama image.

FIG. 6 is an explanatory diagram showing that the PTZ camera 31 is controlled by the video server 32, and a panorama image P0 is combined from an output image of the PTZ camera 31, a panning field angle movement P, and a tilting field angle movement T.

Each of Pa, Pb, and Pc is one image obtained from the PTZ camera 31.

Those images are combined by the video server 32, thereby making it possible to obtain the panorama image P0.

The same is applied to a device into which the PTZ camera 31 and the video server 32 are integrated.

In FIG. 6, there is considered a case in which Pa is a blue sky or starry sky with respect to the image P0 that has been combined into a panorama, and the contrast is very low.

At the time of imaging the above area, the focus lens 8 is temporarily fixed to the distance to the object, thereby making it possible to prevent defocus due to AF, which is thus effective.

Second Embodiment

Figure 7:
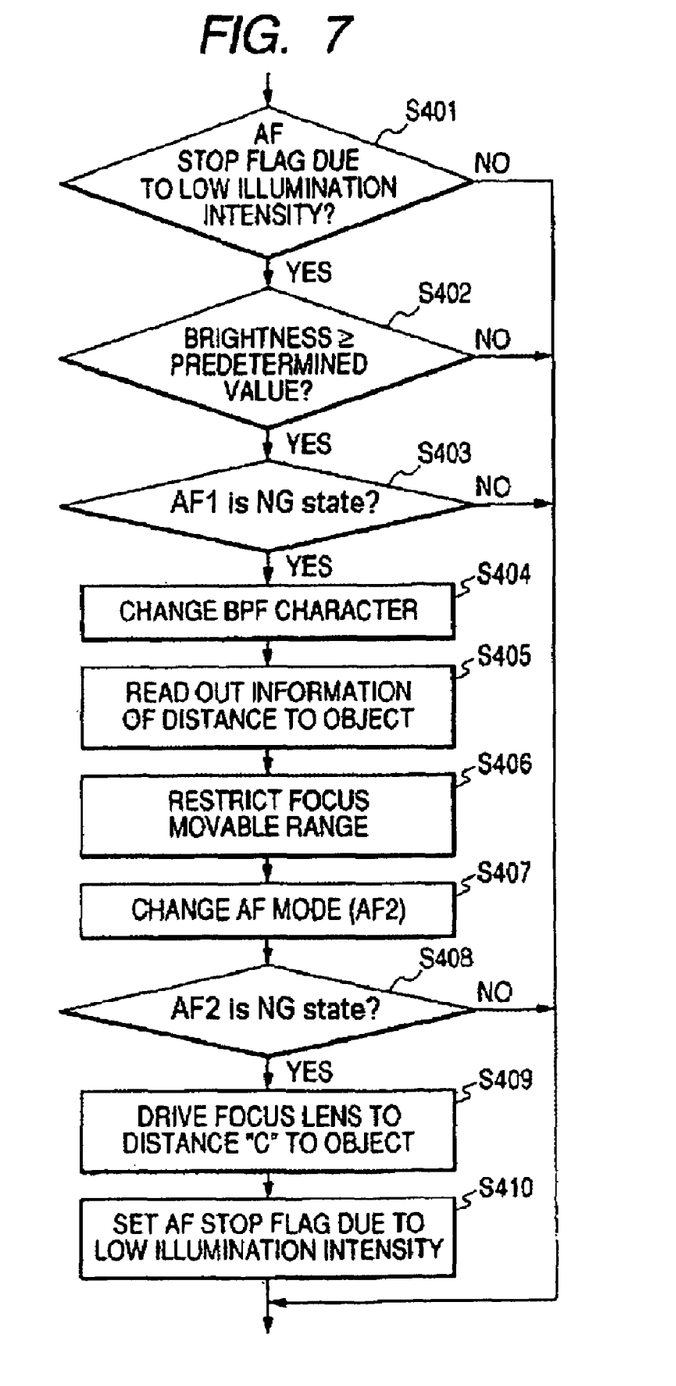
FIG. 7 is a flowchart showing the operation of a second embodiment.

FIG. 7 is a flowchart showing the operation under a low illumination intensity.

First, it is checked whether the AF stop flag due to the low illumination intensity is set, (FIG. 7) or not (Step S401).

In the case of the AF stop flag being set due to the low illumination intensity, the operation is finished as it is. In the case of no AF stop flag being set due to the low illumination intensity, the brightness is checked (Step S402), and when the brightness is lower than a predetermined value, the operation is advanced to Step S403. When the brightness is equal to or higher than the predetermined value, the operation is finished.

The focusing due to AF is checked (Step S403), and when focusing can be conducted, the operation is finished.

In the case where focusing cannot be conducted (AF1 is NG state), the characteristics of BPF are switched so that the focus detection characteristics of AF become optimum at the low illumination level (Step S404).

Then, the area in the image pickup direction is detected due to the panning angle and the tilting angle, and the information of distance to an object in the detected area is read out from the memory 21 (Step S405), and the focus movable range is limited on the basis of the information of distance to an object (Step S406).

The mode is switched to an AF mode 2 that has been so adjusted as to be optimum at the low illumination level (Step S407) to conduct the focal operation.

The focusing is checked in the AF mode 2 (Step S408), and when focusing can be conducted, the focal operation is finished (Step S408).

When focusing cannot be conducted (AF2 is NG state), the focus lens 8 is driven to the distance C to the object according to the position of the zoom lens (Step S409), and the AF stop flag due to the low illumination level is set and finished (Step S410).

In the AF mode 2, for example, the characteristics of BPF are switched to those to emphasize the low contrast, and the sharpness level is evaluated while the focus lens is fed by the minimum feed amount within the focus limit range, and the fine variation of contrast can be detected, for example, the peak value can be detected.

Third Embodiment

Figure 8:
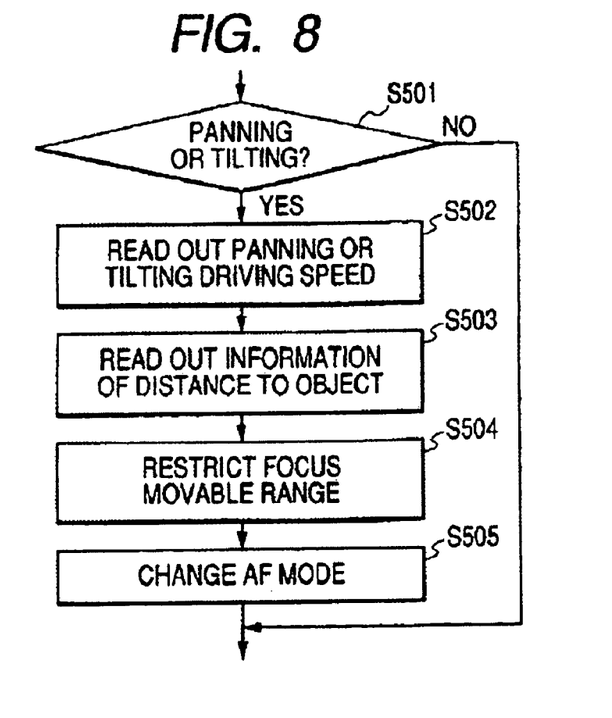
FIG. 8 is a flowchart showing the operation of a third embodiment.

FIG. 8 is a flowchart showing the operation of a third embodiment.

In the third embodiment, the panning and tilting operation state is detected (Step S501), and when the operation state is detected, the operation is advanced to Step S502 while the stop state is detected, the operation is finished. Then, the information of distance to an object corresponding to the panning and tilting movement speeds is read out (Steps S502 and S503).

According to the read information, the movable range of the focus lens 8 is limited (Step S504), and the AF mode is also switched to the characteristics corresponding to the limited movable range (Step S505)

For example, in the case where panning and tilting are conducted at a very high speed, the variation of the object is large, and the focus evaluation value (sharpness level) is not effective. Therefore, the focus driving is conducted by using the information of distance to an object which is developed in the memory 21, thereby making it possible to execute the stable focusing operation.

This application claims priority from Japanese Patent Application No. 2005-026463 filed on Feb. 2, 2005, which is hereby incorporated by reference herein.

What is claimed is:

1. An image pickup apparatus, comprising:
   an image pickup element for converting a light signal that is focused on an image pickup surface into an electric signal;
   a lens group for guiding a light of an object image to the image pickup element;
   an image pickup field angle changing section for driving a zoom lens in the lens group to change an image pickup field angle;
   a focus evaluation signal extraction circuit for extracting a focus evaluation signal corresponding to the sharpness level from an image signal obtained from the image pickup element;

focusing means for driving a focus lens in the lens group according to an output of the focus evaluation signal extraction circuit;

object distance detecting means for detecting a distance to an object according to positional information on the zoom lens and the focus lens;

incident light intensity detecting means for detecting an incident light intensity to the image pickup element;

image pickup direction changing means for changing an image pickup direction in the lens group; and a memory for storing information of distance to an object which is obtained from the object distance detecting means according to positional information of the image pickup direction changing means in a state where an output of the incident light intensity detecting means is equal to or higher than a predetermined value and in a state where AF can be conducted, wherein when it is determined that the output of the incident light intensity detecting means is lower than the predetermined value and AF cannot be conducted, the information of distance to an object is acquired from the memory according to the positional information of the image pickup direction changing means, and the focus lens is driven according to the information of distance to an object.

2. An image pickup apparatus according to claim 1, wherein when it is determined that the output of the incident light intensity detecting means is lower than the predetermined value and AF cannot be conducted, a movement range of the focus lens is limited on the basis of the information of distance to an object.

3. An image pickup apparatus according to claim 1, wherein the movement range of the focus lens is limited on the basis of the information of distance to an object from the storing means within a predetermined period of time while the image pickup direction is being changed due to the image pickup direction changing means.

4. An image pickup apparatus according to claim 1, wherein a plurality of output values from the incident light intensity evaluating means are stored according to a time change, and the amount of change of the incident light intensity is monitored within a predetermined period of time, whereby the focusing means is restarted when the amount of change is equal to or higher than a predetermined value.

5. An image pickup apparatus according to any one of claims 1 to 4, wherein the image pickup apparatus is a part of a monitor camera system.

6. An image pickup apparatus according to any one of claims 1 to 4, wherein the image pickup apparatus is a part of a teleconference system.

7. An image pickup apparatus according to claim 2, wherein the image pickup apparatus is a part of a monitor camera system.

8. An image pickup apparatus according to claim 3, wherein the image pickup apparatus is a part of a monitor camera system.

9. An image pickup apparatus according to claim 4, wherein the image pickup apparatus is a part of a monitor camera system.

10. An image pickup apparatus according to claim 2, wherein the image pickup apparatus is a part of a teleconference system.

11. An image pickup apparatus according to claim 3, wherein the image pickup apparatus is a part of a teleconference system.

12. An image pickup apparatus according to claim 4, wherein the image pickup apparatus is a part of a teleconference system.

* * * * *